April 29, 1952 — A. SCHMALENBACH — 2,594,352
CONTINUOUS DISTILLATION OF TAR
Filed Aug. 27, 1949
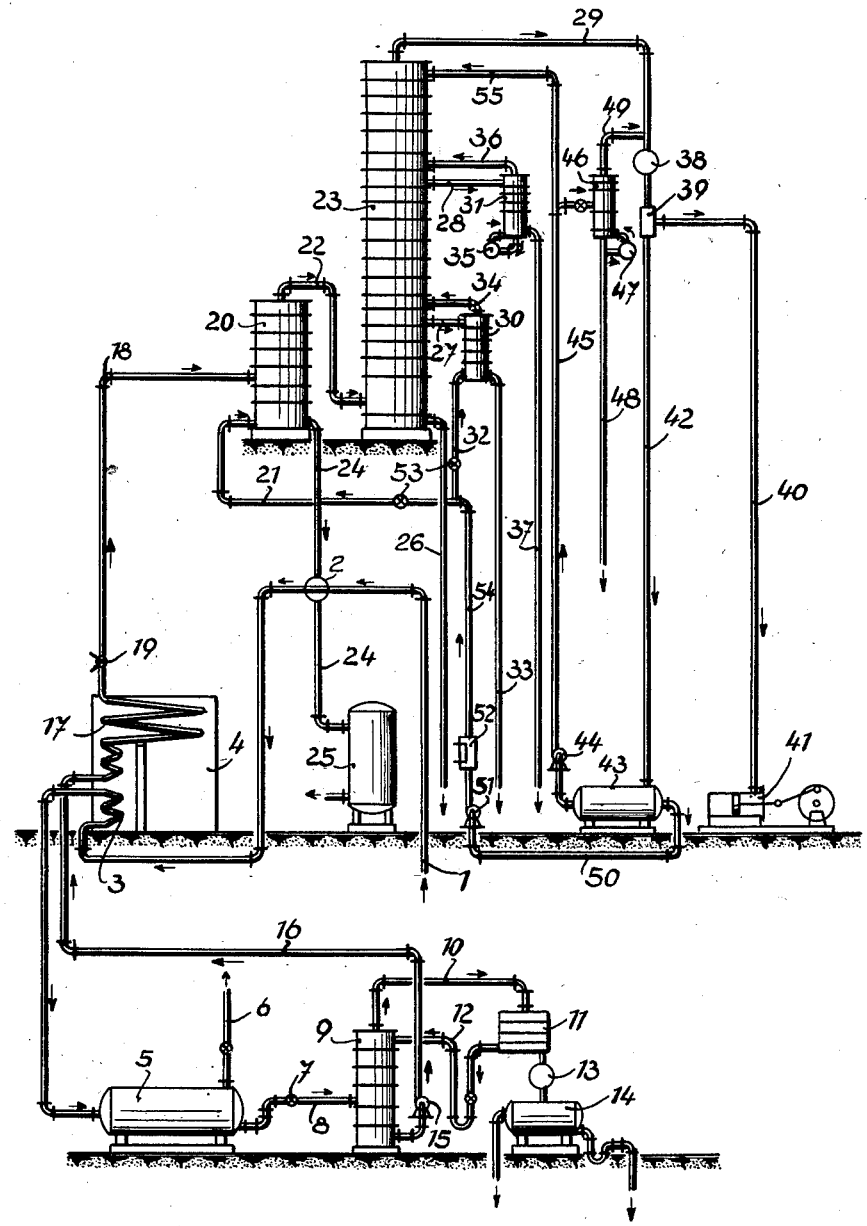
INVENTOR.
ADOLF SCHMALENBACH.
By Thomas J. O'Brien
his ATTORNEY.

Patented Apr. 29, 1952

2,594,352

UNITED STATES PATENT OFFICE 2,594,352

CONTINUOUS DISTILLATION OF TAR

Adolf Schmalenbach, Essen-on-the-Ruhr, Germany, assignor, by mesne assignments, to Koppers Company, Inc., Pittsburgh, Pa., a corporation of Delaware Application August 27, 1949, Serial No. 117,829
In France August 27, 1948

6 Claims. (Cl. 196—76)

It is known to resolve tar into several fractions by continuous fractional distillation at atmospheric pressure, the tar being first of all heated in a continuous heater (tubular oven) until the pitch vaporises, the resulting vapour mixture then being finally fractionated. The tar must thus be heated in the continuous heater to a temperature of about 375–380°, according to its composition. This is a disadvantage since at this temperature certain constituents of the tar decompose or are converted in the continuous heater.

It has previously been proposed to carry out the vaporisation of the tar in a vacuum corresponding to an absolute pressure of less than 100 m. m. of mercury and to fractionate the resulting vapour mixture in the vacuum. With this process the temperature in the continuous heater tubes can be reduced to about 340° and the heating of the tar can be effected at an excess pressure of about 1.5 atmospheres, whereby the vaporisation in the continuous heater drops to about 15% to 18%. A deterioration in the quality of the product produced and disturbances in operation by decomposition of the tar in the continuous heater is thereby avoided and the formation of phenol containing waste waters is prevented.

Against these advantages there exist the considerable disadvantages of considerably higher costs of installation for the distilling plant and the more difficult fractionation of the vapour mixture. It is for instance not only necessary, with distillation under high vacuum, to arrange the apparatus at a considerable height above the ground, thus increasing building costs, but the individual apparatus must have a large volume corresponding to the high vacuum. They are therefore heavy and expensive and in practice it is no longer possible to carry out the fractionation in a unitary column. It is necessary rather to arrange several columns adjacent each other and for this it is necessary to have special condensers between the separate fractionation stages to deal with the return flow and the regulation of these renders the operation of the plant more difficult. Moreover, it is in practice impossible to provide the distillation plants operating at high vacuum with bubble or bell-cap columns but one is compelled to employ packed columns i. e. columns packed with loose solid material affording large surfaces for contact with each of flow of gas and liquid therethrough, thereby rendering fractionation more difficult.

The invention aims at arranging the continuous distillation of coal-tar in such a way as to obtain both the advantages of operation with high vacuum in the pitch distilling columns, namely the avoidance of decomposition reactions in the tar within the continuous heater (tubular oven), and the special advantages of distillation at atmospheric pressure, namely the smaller costs of construction of the apparatus and the simpler fractionation of the vapour mixture.

The solution of this problem consists according to the invention in that the tar, heated to temperatures below those which have to be attained in continuous distillation at atmospheric pressure, is thereafter vaporised as far as the pitch fraction in one stage in a distilling chamber under comparatively reduced pressure in the presence of steam with which the residue (pitch fraction) was previously treated, and that the vapour mixture so produced is fractionated, with the corresponding synchronisation of the quantity of steam and vacuum, in a bubble or bell-cap column with which side columns are associated as required, in the usual way. Such synchronisation is conventional in the art of distilling under vacuum, i. e., drawing the vacuum first carefully so as to avoid foaming of the liquid in the bubble cap column, and then applying the steam so that it does not rush through the liquid so as to prevent the downflow of reflux liquid in the bubble-cup column.

In the process according to the invention it is possible to operate with a substantially lower vacuum than in the known continuous vacuum distillation processes. For a given kind of tar one requires in the new process for example, a vacuum corresponding to an absolute pressure of 300–400 m. m. of mercury in the vaporising chamber, whilst the temperature necessary under these conditions for the vaporisation of the tar amounts to about 335–340°, allowing for a vaporisation of about 40% in the continuous heater, whilst by increasing the flow cross-section an unfavourable increase in the speed of flow, which in itself rises through vaporisation, has to be counteracted.

By corresponding reduction or increase in the pressure in the continuous heater the vaporisation can, if necessary, be reduced, for example to 20%–25%, whilst the temperature must be increased to about 345–350°. Therefore one obtains for the continuous heater the conditions in which an undesired decomposition or conversion of the tar constituents is effectively avoided. In each case it is possible to carry out the fractionation of the vapour mixture in a bell-cap column the operation of which is simpler than that of a packed column. The higher pressure loss which the bubble or bell-cap column exhibits in comparison with the packed column is in this case unimportant, since in the vaporisation zone of the process only a comparatively small vacuum is required.

The main advantage of the process according to the invention lies in the fact that the building costs for the distillation apparatus are considerably smaller than for the employment of the known method of operation with high vacuum; they are in practice not appreciably higher than for plants which operate under atmospheric pressure. This advantage is obtained without a deterioration in relation to the careful treatment of the tar constituents which is characteristic of the method of operation with high vacuum, and on the other hand, with a maintenance of the operationally simpler fractionation which distinguishes from the known atmospheric process. In particular, the anthracene oil fraction has, in the process according to the invention the same excellent quality as in the high-vacuum process.

In the process according to the invention the steam introduced in the process goes over with the phenol oil. In order to avoid the formation of phenol-containing waste water the invention provides for separating the water from the aqueous condensate of the last fraction (phenol oil and water) and reintroducing it, in the form of steam, at a suitable point in the distillation apparatus, i. e., the vaporizing chamber, which is under vacuum of 300–400 m. m. of mercury. The phenol-containing steam vapour is preferably introduced into the pitch distilling column. A part of the stream of phenol-containing steam vapour can also be returned for washing-oil to the side columns which may be provided.

The phenol oil fraction, after mechanical separation of the water, still contains a small quantity of water in solution. This is removed according to the invention by heating the phenol oil fraction in a small auxiliary column and introducing the resulting vapours (mainly steam) into the vapour conduit—which is under vacuum—of the phenol oil fraction before the condenser, or into the apparatus—under vacuum, at another suitable point.

Through this feature any formation of phenol-containing waste waters is prevented, so that the process in this respect is completely equivalent to the high vacuum distillation process. As, in the case of the vaporisation of phenol-containing liquor, it is only a question of relatively small quantities, the additional heating requirement for the total process is unimportant.

The drawing illustrates schematically a plant suitable for the application of the invention.

The tar to be distilled is introduced into the plant at 1. It passes first of all through the heat exchanger 2, in which the raw tar is preheated by the hot pitch fraction which is running off from the pitch distilling column 20, and then passes into the first pipe system 3 (convection zone) of a tubular oven 4. There the tar is preheated under pressure to such a temperature that in the following separating vessel 5 it easily separates from the water contained in it. From the vessel 5 the separated water can be easily led off through the pipe 6 controlled by a pressure reducing valve. The tar freed from water passes through the pipe 8, controlled by a pressure reducing valve 7, into a column 9 which is operated substantially at normal pressure. On account of this, vaporisation of the light constituents of the tar takes place here. The resulting vapours are drawn off as a top fraction through the vapour pipe 10, which leads to the condenser 11, from which the necessary return flow to the column 9 goes back through the pipe 12. The distillate comes through the cooler 13 in to the separator vessel 14 where a separation between light oil and water can be effected.

The tar freed from water and light oil is then forced by means of the pump 15 from the base of the column 9 through the pipe 16 into the second pipe system 17, (convection and radiation zone) of the tubular oven 4, where it is heated to the temperature required for later vaporisation. From the pipe system 17 a pipe 18—in which a pressure maintaining valve 19 may be provided if desired—leads into the vaporising vessel (pitch column) 20.

In the pitch column 20 a suitable vacuum corresponding to an absolute pressure of 300–400 m. m. of mercury is maintained so that the hot tar—if necessary previously kept under slightly increased pressure—is there completely vaporised to the pitch fraction. At the same time steam is introduced through the base of the column 20 through the pipe 21. The lower part of the column 20 thus acts as a distilling column. This resulting mixture of tar vapours and steam is drawn off at the head of the column 20 through the pipe 22 and enters the adjoining fractionating column 23.

The base fraction (pitch) occurring in the vaporising column 20 flows through the pipe 24 through the heat exchanger 2 to the receiver 25.

The separation of the vapour mixture is effected in only a single fractionating column, as illustrated at 23. From the base of this column the anthracene oil fraction is withdrawn through the pipe 26, the washing oil somewhat higher up through the pipe 27, the naphthalene oil fraction still higher up through the pipe 28, and the phenol oil fraction through the pipe 29.

The side columns 30, 31 are provided for the treatment of the naphthalene and washing oil fractions. From beneath the column 30 some direct steam for distilling off light boiling fractions from the escaping washing oil fraction is introduced through the pipe 32. The washing oil fraction is drawn off through the pipe 33. The steam introduced into the side columns returns, with the vaporised portion of the washing oil fraction, through the pipe 34 into the fractionating column 23.

In the treatment of the naphthalene oil fraction in the side column 31 the introduction of steam is not as a rule necessary. In order to remove the light boiling fraction from the naphthalene oil fraction as far as possible a circulatory heater 35 of the usual kind may be provided here with advantage. The side column 31 is otherwise connected, similarly to the column 30, through a steam return pipe 36 with the fractionating column 23. The naphthalene oil fraction is drawn off through the pipe 37.

The vapours which escape through the pipe 29 at the top of the column 23 consist of the phenol oil fraction and steam. The mixture of vapours passes into a cooler 38 from which the condensate flows into a receiver 39 which is connected on the one hand with a vacuum pump 41 through the pipe 40 and on the other hand through the condensate run-off pipe 42 with the separator vessel 43. In this the water is mechanically separated from the phenol oil fraction (by decanting). The phenol oil partially freed from water is partly supplied through the pump 44 and the pipe 45 to an auxiliary column 46 operating under vacuum and provided with a circulatory heater 47, and partly supplied as a return flow at 55 to the column 23. In the auxiliary column 46 the phenol oil is completely freed from water so that it can be drawn off, free from water through the pipe 48. The resulting water vapour returns through the pipe 49 in to the vapour pipe 29 leading to cooler 38, receiver 39, pipe 42 and the separator vessel 43.

The phenol-containing water forming in the separator container 43 flows through the pipe 50 to a pump 51 which forces the water into an evaporator 52. Its vapour discharge pipe 54 is in connection with the pitch column 20 and the side column 30 for the washing-oil fraction, with the interposition of the pressure reducing valves 53 and the steam pipes 21, 32, so that steam can be introduced in adjustable quantities into the vaporising vessel (pitch column) 20.

As indicated in the drawing, the apparatus of the plant which are under reduced pressure are arranged at a higher level than the parts of the apparatus working at normal pressure. To the first category there belong the vaporising vessel 20, the fractionating column 23 with the relevant side columns and the condenser 38 together with the auxiliary column 46. The difference in height between the parts of the apparatus depends on how high is the vacuum in each of the apparatus. The run-off pipes 24, 26, 33, 37, 42 are, in the known manner, constructed so that the fluid column forming in them corresponds to the vacuum of the apparatus connected therewith.

I claim:

1. A process for the continuous distillation of coal tar with the recovery of fractions with narrow boiling limits, wherein tar is heated in a continuous heater, and is then vaporized as far as the pitch fraction in a separate distilling vessel, and the desired fractions are recovered from the vapour mixture by fractionation in a bubble-cap column, characterized in that for the vaporization of the tar, it is heated in the continuous heater to temperatures between 335 and 350° C. and at about normal pressure, and is vaporized at a reduced pressure of between 300 and 400 m. m. of mercury and with the simultaneous introduction of steam thereto in one stage in the separate distilling vessel, and the fractionation of the vapour mixture from said distilling vessel is carried out with a correspondingly reduced pressure in an adjoining bubble-cap column, with separate withdrawal therefrom of anthracene oil, washing oil, naphthalene oil, and phenol oil fractions.

2. A process as claimed in claim 1, and in which the fractionation of the vapour mixture from said distilling vessel is carried out with a corresponding synchronisation of the quantity of steam and vacuum in the adjoining bubble-cap column.

3. A process as claimed in claim 1, and in which the fractionation is carried out with a return flow to a part of the process under said reduced pressure of water from said steam and phenol oil from the phenol oil fraction.

4. A process as claimed in claim 1, characterized in that the water of said steam is separated from the aqueous condensate of the phenol fraction, and is then supplied in the form of steam again to the distilling vessel while it is subjected to said vacuum corresponding to an absolute pressure between 300 and 400 mm. of mercury.

5. A process as claimed in claim 4, and in which the fractionation is carried out with a return flow to the top of the bubble-cap column of dewatered phenol oil from the aqueous condensate of the phenol fraction.

6. A process as claimed in claim 4 characterized in that the phenol fraction is freed from water by decanting and the phenol oil content thereof, that is to be recovered as an end product of the process, is then separately heated again in vacuo in order to completely vaporize its residual water content, the resulting steam being led off with other vapours in the process where they are subjected to reduced pressure, and the phenol oil, completely freed of water, is then withdrawn as an end product of the process free from water.

ADOLF SCHMALENBACH.

REFERENCES CITED

The following references are of record in the file of this patent:

UNITED STATES PATENTS

| Number | Name | Date |
|---|---|---|
| 1,856,283 | Keith, Jr. | May 3, 1932 |
| 2,260,072 | Wilton | Oct. 21, 1941 |